United States Patent [19]

Vasilos

[11] Patent Number: 4,613,522

[45] Date of Patent: Sep. 23, 1986

[54] OXIDATION RESISTANT CARBON-CARBON COMPOSITES

[75] Inventor: Thomas Vasilos, Winthrop, Mass.

[73] Assignee: Avco Corporation, Wilmington, Mass.

[21] Appl. No.: 426,600

[22] Filed: Sep. 29, 1982

[51] Int. Cl.[4] .............................................. B05D 1/36
[52] U.S. Cl. .................................... 427/202; 264/29.5;
427/203; 427/204; 427/205; 427/249;
427/255.4; 427/380
[58] Field of Search ................ 427/228, 380, 202–205,
427/255.4, 249; 264/29.5

[56] References Cited

U.S. PATENT DOCUMENTS

| | | | |
|---|---|---|---|
| 3,738,906 | 6/1973 | Olcott | 427/249 |
| 3,925,577 | 12/1975 | Fatzer et al. | 427/249 |
| 4,101,354 | 7/1978 | Shaffer | 427/228 |
| 4,119,189 | 10/1978 | Ehrenreich | 427/228 |
| 4,321,298 | 3/1982 | Shaffer et al. | 427/228 |

*Primary Examiner*—Norman Morgenstern
*Assistant Examiner*—Janyce A. Bell
*Attorney, Agent, or Firm*—Abraham Ogman

[57] ABSTRACT

An oxidation resistant carbon-carbon composite (31) including a plurality of graphite fibers (13) within a carbonized (graphitized) matrix (14). A first material including boron (16) and a second material including silicon (18) are applied thereto. Heating the composite in the course of service use to a temperature at which the composite cracks enables the boron and silicon to combine to provide a borosilicate sealant of sufficiently low viscosity for sealing cracks in the composite.

11 Claims, 6 Drawing Figures

OXIDATION RESISTANT CARBON-CARBON COMPOSITES

BACKGROUND OF THE INVENTION

This invention relates to an oxidation resistant carbon-carbon composite and to a method for making such a composite including provision of a self-healing carbon-carbon fiber composite. "Carbon-carbon composites" as used herein should be understood to refer to fiber composites which include a carbon or graphite fiber impregnated with a carbon based resin such as phenolic. The composite is formed through a heating process during which volatiles therein are driven from the resin which is carbonized and graphitized. Hence a carbon-carbon composite remains, i.e. carbon fiber in a carbon matrix.

Presently the art of making and using carbon-carbon composite experiences difficulty in maintaining a long composite lifespan. Typically in an oxidizing medium at high temperatures such as during various heating applications, the carbon will react with oxygen to produce CO and $CO_2$. The composite structurally breaks down and thus its use in various applications where heating is encountered such as in turbine engines, is limited and unreliable.

In an attempt to remedy this situation silicon based compounds such as silicon carbide have been infiltrated into the carbon-carbon composites porous fiber structure. When heated above a certain level silicon carbide reacts with the oxygen to provide a silicon oxide glass which is stable in the oxidizing medium. However, difficulty is still encountered because silicon carbide cracks during cycling through low temperature (e.g. approximately 1200° F. regimes. Such cracks occur because silicon carbide and the carbon-carbon composite exhibit different coefficients of expansion. At temperatures above 2500° F., the silicon oxide is typically in a liquid form with a sufficiently reduced viscosity in general to enter and seal the cracks. However, at lower temperatures, e.g. below 2500° F., such as occur in normal turbine cycling the viscosity of silicon oxide is too high to effectively seal the cracks. Oxygen enters the cracks and the composite may be oxidized thereby losing approximately 10% or more of its weight per hour.

SUMMARY OF THE INVENTION

It is therefore an object of this invention to provide an improved carbon-carbon composite which exhibits enhanced protection against oxidation and therefore retards undesirable composite weight loss and deterioration and extends composite life.

It is a further object of this invention to provide such a carbon-carbon composite which exhibits an improved and effective self-healing mechanism for sealing protective coating cracks therein over a wide range of both high and low heating temperatures.

It is a further object of this invention to provide a carbon-carbon composite which may be utilized for enhanced periods of time in a wide variety of oxidizing medium applications.

It is a further object of this invention to provide a carbon-carbon composite and a method for making such a composite which reduce degradation of fibers.

It is a further object of this invention to provide a method for making the above carbon-carbon composite.

This invention results from a realization that an improved sealing mechanism may be provided for carbon-carbon composites by utilizing materials which include boron in addition to a silicon containing material. Under proper conditions of heating such materials may provide a borosilicate glass which acts to fill and seal cracks in carbon-carbon fiber composites at relatively low (e.g. below 2500° F.) and heretofore difficult to seal temperatures.

This invention features an oxidation resistant carbon-carbon composite including a plurality of graphite fibers within a carbonized or graphitized matrix. A first material including boron and a second material including silicon are applied to the composite. During the course of service use, heating the composite to a temperature at which the composite cracks enables the boron and silicon to combine to provide a borosilicate sealant of sufficiently low viscosity for sealing cracks in the composite.

In a preferred embodiment the first material may be particulate in form and may comprise boron metal or boron carbide. It may be applied between the layers of fiber before or after such layers have been resin impregnated.

The second material may include silicon carbide and is preferably coated on the exterior surface of the composite.

A method for providing an oxidation resistant carbon-carbon fiber array-reinforced-carbon matrix composite according to this invention includes impregnating a carbon fiber array with a carbonaceous matrix to constitute a preform. By preform is meant the carbon-carbon composite prior to bonding and heating cycles. A first material including boron is applied to the fiber array. The preform is heated to approximately 650° C. to carbonize the resin matrix and is heated to between 2000° C. and 2300° C. to graphitize the matrix and vaporize the first material and disperse such vaporized material throughout the composite. A second material including silicon is applied to the composite. By such a method the aforedescribed crack sealing composite is constructed.

In a preferred embodiment the fiber array may be arranged in layers and the first material applied between layers. The preform may be compression bonded and cured at a temperature of between 65° C. and 175° C. The first material may include boron or boron carbide and may be sprinkled in particle form on the fiber array before or after such fibers have been resin impregnated.

The second material may include silicon carbide which in a layered embodiment may be coated on the exterior surface of the composite.

Other objects, features and advantages of the invention will be apparent from the following detailed description of preferred embodiments with reference therein to the accompanying drawing in which:

DESCRIPTION OF PREFERRED EMBODIMENTS

Figure 1:
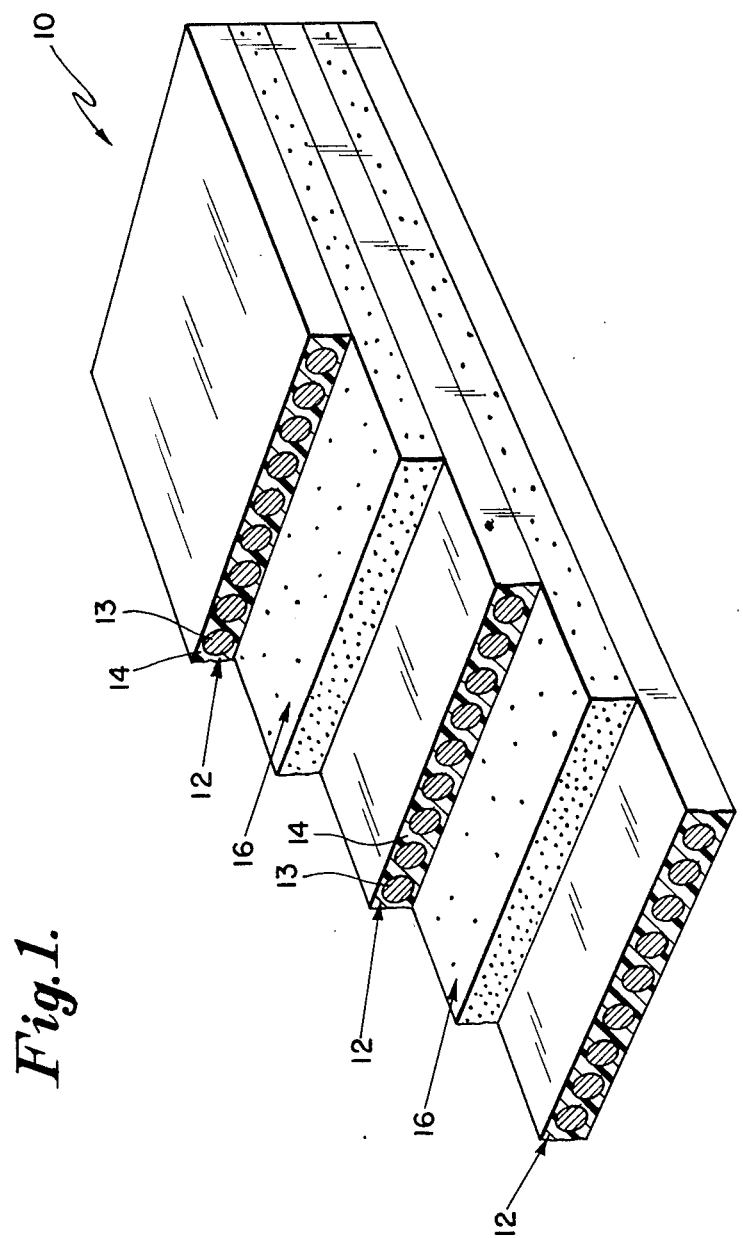
FIG. 1 is an isometric cut away view of the oxidation resistant carbon-carbon composite of this invention prior to carbonization.

There is shown in FIG. 1 a carbon-carbon preform 10 according to this invention. A preferred embodiment of plurality of carbon or graphite fiber plies 12 are arranged in layers. Each layer may comprise fibers 13 or alternatively various orthogonal arranged fibers (e.g. fabrics) impregnated by a resin matrix 14. Typically each ply 12 is prepregged e.g. impregnated with resin before being layed up. Note that a non-layered fiber array may also be utilized according to the teaching of the invention.

A layer of boron carbide particles 16 is sprinkled such as by a measured sieve on top of each impregnated ply 12. The particles may alternatively be applied prior to resin impregnation. The particles themselves may be impregnated in resin 14. Note that the thickness of layer 16 as well as individual boron carbide particles are greatly exaggerated for clarity. In addition to the fiber plies 12 and impregnated resin matrix 14 the interior of composite preform 10 may contain 5–15% boron carbide by volume. Preform 10 is typically constructed by first impregnating each ply 12 with resin, then applying the boron carbide particles and finally laying the plies 12, one on top of the other. Note that any number of plies may be utilized to attain the desired thickness. A layer of boron carbide is preferably interposed between each pair of plies. Additionally, boron metal may be substituted for boron carbide, and transforms to boron carbide during processing.

Figure 2:
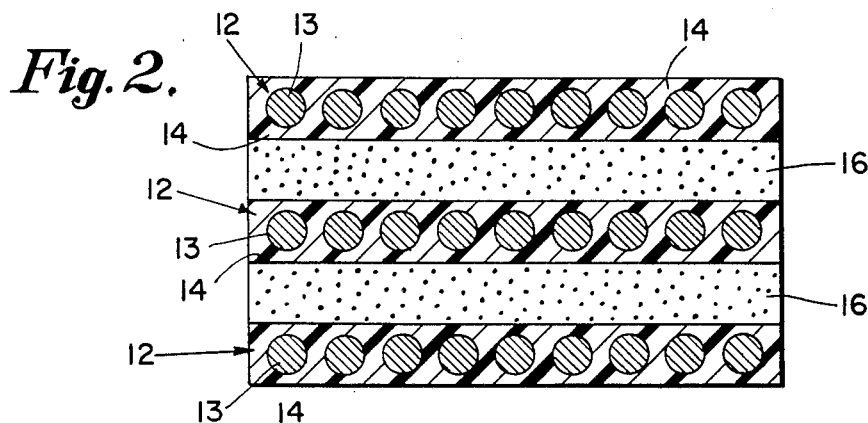
FIG. 2 is a schematic cross-sectional view of the composite of FIG. 1 following carbonization.
Figure 3:
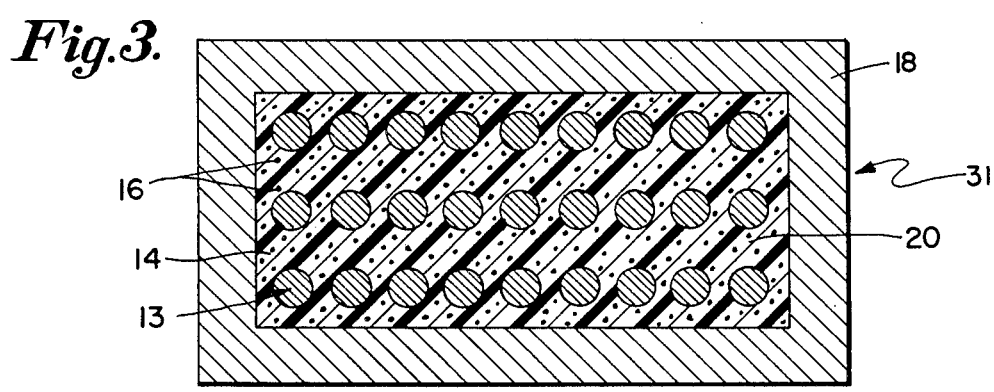
FIG. 3 is a schematic cross-sectional view of the composite of FIG. 1 following graphitization and coating with a silicon carbide overlay.

Plies 12 are compression bonded and heated such as by unpictured conventional heating means to a temperature between 65° C.–175° C. which cures the composite preform 10. Carbonization (FIG. 2) is performed by heating composite preform 10 to 650° C. The preform is then graphitized at temperatures up to 2300° C. to thereby provide carbon-carbon composite 31 FIG. 3. Note that additional cycles of resin impregnation, carbonization and grahitization may be performed to attain a desired densification. At the graphitization temperature the boron carbide is vaporized and distributed substantially uniformly throughout the composite 31. A layer of silicon carbide 18 is then coated onto the exterior surfaces 20 of the composite 31. Such coating is typically performed via chemical vapor deposition.

Figure 4:
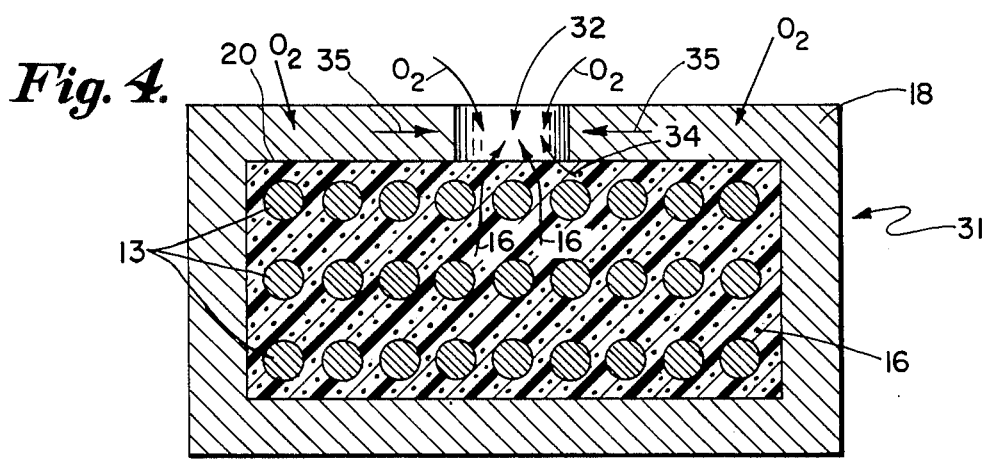
FIG. 4 is a schematic cross-sectional view of the carbon-carbon composite of this invention following formation of a crack during service use thereof.
Figure 5:
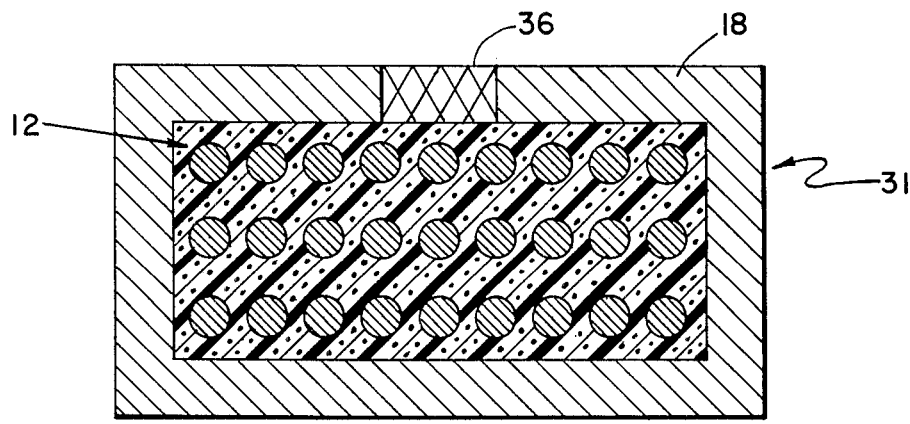
FIG. 5 is a schematic cross-sectional view of the carbon-carbon composite illustrating the selfhealing mechanism for sealing relatively low temperature (e.g. 2500° F. and below) cracks according to this invention.

The composite 31 is subsequently utilized in service in heating applications wherein it is placed in an oxidizing medium. A typical example of such use is turbine engine operations. As shown in FIG. 4 when composite 31 is heated to a level of approximately 1200° F. cracks 32 may occur in silicon carbide coating 18 due to mismatches between the coefficients of expansion exhibited by the silicon carbide layer 18 and the fiber plies 12 impregnated by resin matrix 14. Oxygen $O_2$ enters crack 32 and oxidizes a small portion of the boron carbide 16 to form boron oxide which migrates to surface 20 as a fluid (at temperatures below) 1200° F. or as a combination of liquid and vapor (at temperatures above 1200° F. At surface 20 the migrating boron oxide indicated by arrows 34 penetrates crack 32. As this process continues a portion of the silicon carbide in layer 18 also oxidizes (see $O_2$ entering layer 18) to form a glass of silicon oxide, arrows 35. As shown in FIG. 5 the boron carbide penetrating crack 32 and the silicon oxide combine to produce a borosilicate glass 36 (x-cross section) which has a viscosity sufficiently low to enable it to flow into and seal crack 32 and thus restrict further oxygen entry into the interior of composite 31. oxidation of the carbon-carbon structure is therefore inhibited. Premature weight loss deterioration is prevented and composite life is increased. For example by utilizing the boron carbide composition disclosed herein weight losses in the composite may be reduced from more than 10 percent per hour as is commonly experienced presently in the art to less than 0.1% per hour.

Figure 6:
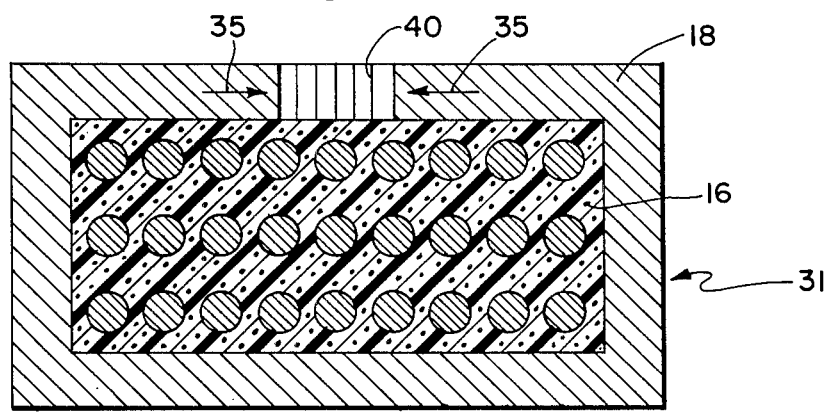
FIG. 6 is a schematic cross-sectional view of the carbon-carbon composite illustrating the self healing mechanism for sealing relatively high temperature (e.g. above 2500°) cracks.

At temperatures below approximately 2500° F. the viscosity of the silicon oxide glass is typically too high to permit the glass to flow into and seal crack 32 particularly where the crack is relatively large. Therefore at such temperature ranges the above described borosilicate glass often acts alone to seal the cracks. However, as shown in FIG. 6 at temperatures above approximately 2500° F. The silicon oxide 35 typically becomes thin enough to flow sufficiently to fill cracks 32 and provide a seal 40. Note that particles of boron carbide 16 remain dispersed throughout composite 31. If silicon oxide should fail at above 2500° F. to fill some or all of cracks 32; where for example the cracks are exceptionally large or the silicon carbide is not present in sufficient quantity to fill cracks 32 itself remains viscous, the boron carbide may again be oxidized and combined with the silicon oxide as heretofore described to supplement silicon oxide glass and provide a borosilicate glass to seal the cracks and provide oxidation resistance.

Therefore, the present invention is particularly useful as a method of providing self sealing and oxidation protection for carbon-carbon composites when used in relatively low temperature applications, e.g., such as turbine engine cycling, wherein the heating encountered is less than 2500° F. Above that temperature level the composite of this invention may rely upon silicon oxide glass sealing protection or upon the boron-silicate glass disclosed herein. Particular uses for this composite include turbine engines, rocket nozzles and braking systems.

It is evident that those skilled in the art, once given the benefit of the foregoing disclosure, may now make numerous other uses and modifications of, and departures from, the specific embodiments described herein without departing from the inventive concepts. Consequently, the invention is to be construed as embracing each and every novel feature and novel combination of features present in, or possessed by, the apparatus and techniques herein disclosed and limited solely by the spirit and scope of the appended claims.

What is claimed is:

1. Method for making an oxidation resistant carbon fiber array-reinforced-carbon matrix composite comprising:

impregnating each one of a number of the carbon fiber array with a resin matrix capable of being converted to a carbon matrix to constitute a preform, distributing a first material comprising boron or material containing boron in particulate form throughout the resin matrix, heating said preform to 650° C. to carbonize said resin matrix, and heating said preform to between 2000° C. and 2300° C. to graphitize said resin matrix, vaporize said first material and disperse said first material throughout said composite, applying a second material including silicon to said array, whereby heating said composite to a temperature at which said composite cracks enables said boron and silicon to combine to provide a borosilicate sealant of sufficiently low viscosity for sealing cracks in said composite.

2. Method in accordance with claim 1 including arranging said fiber array in layers and applying said first material between each said layer.

3. Method in accordance with claim 2 including coating said second material on the exterior surfaces of said resin impregnated and graphitized array.

4. Method in accordance with claim 1 wherein said first material includes boron carbide.

5. Method in accordance with claim 1 including disposing said first material in said matrix.

6. Method in accordance with claim 1 further including sprinkling said first material in particulate form on said fiber array.

7. Method in accordance with claim 1 wherein said second material includes silicon carbide.

8. Method in accordance with claim 1 further including compression bonding said impregnated plies prior to heating.

9. Method in accordance with claim 1 further including heating said preform between 65° C. and 175° C. to cure said preform prior to carbonization.

10. A method of constructing a self-healing carbon structure comprising the steps of:

dispersing boron in particulate form or a material containing boron on the carbon by heating said composite above 2000° C. to vaporize the boron;

encapsulating the carbon-boron composite with a silicon-containing coating; and heating said composite to a temperature at which said composite cracks to enable said boron and silicon to combine to provide a borosilicate sealant of sufficiently low viscosity for sealing cracks in said composite.

11. Method of making a self-healing carbon structure as defined in claim 10 wherein the borosilicate is a glass.

* * * * *